US009138690B2

(12) United States Patent
Manabe

(10) Patent No.: US 9,138,690 B2
(45) Date of Patent: Sep. 22, 2015

(54) METHOD FOR PRODUCING AIR-PERMEABLE COMPOSITE SHEET

(75) Inventor: Hiroshi Manabe, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 235 days.

(21) Appl. No.: 13/124,498

(22) PCT Filed: Oct. 16, 2009

(86) PCT No.: PCT/JP2009/067894
§ 371 (c)(1),
(2), (4) Date: Jul. 18, 2011

(87) PCT Pub. No.: WO2010/044456
PCT Pub. Date: Apr. 22, 2010

(65) Prior Publication Data
US 2011/0268961 A1 Nov. 3, 2011

(30) Foreign Application Priority Data

Oct. 17, 2008 (JP) ................................ 2008-268846

(51) Int. Cl.
B29C 55/02 (2006.01)
B01D 69/12 (2006.01)
B01D 39/16 (2006.01)
C08J 5/18 (2006.01)
C08J 9/40 (2006.01)
B01D 67/00 (2006.01)
B01D 71/36 (2006.01)
B29C 55/04 (2006.01)
B29C 55/12 (2006.01)
B29K 27/18 (2006.01)
B29K 105/00 (2006.01)
B29K 105/04 (2006.01)
B29L 31/14 (2006.01)

(52) U.S. Cl.
CPC ............ B01D 69/12 (2013.01); B01D 39/1692 (2013.01); B01D 67/0081 (2013.01); B01D 71/36 (2013.01); B29C 55/04 (2013.01); B29C 55/12 (2013.01); C08J 5/18 (2013.01); C08J 9/40 (2013.01); B01D 2239/10 (2013.01); B01D 2323/00 (2013.01); B29K 2027/18 (2013.01); B29K 2105/0061 (2013.01); B29K 2105/04 (2013.01); B29L 2031/14 (2013.01); C08J 2327/18 (2013.01); C08J 2483/00 (2013.01); Y10T 428/249991 (2015.04)

(58) Field of Classification Search
CPC ...................................................... B29C 55/02
USPC .............................. 264/45.8, 45.1; 428/319.3
See application file for complete search history.

(56) References Cited

U.S. PATENT DOCUMENTS

| 4,613,544 A | 9/1986 | Burleigh |
| 4,921,653 A * | 5/1990 | Aoyama et al. ................. 264/41 |
| 6,361,870 B1 | 3/2002 | Steffl et al. |
| 6,777,356 B2 * | 8/2004 | Sadato et al. ................... 442/76 |

FOREIGN PATENT DOCUMENTS

| EP | 248617 A2 * | 12/1987 |
| JP | 55127444 A * | 10/1980 |
| JP | 2001-225652 | 9/1989 |
| JP | 2004-214787 | 8/1992 |
| JP | 06-49265 | 2/1994 |
| JP | 06049265 A * | 2/1994 |
| JP | 2539013 | 7/1996 |
| JP | 2001-510224 | 7/2001 |
| JP | 2001-278997 | 10/2001 |
| JP | 2001-329105 | 11/2001 |
| JP | 2004-323717 | 11/2004 |
| JP | 2005-2335 | 1/2005 |
| JP | 2005-78645 | 3/2005 |
| JP | 2007-196184 | 8/2007 |
| JP | 2007-253519 | 10/2007 |
| JP | 2007-296756 | 11/2007 |
| JP | 2008-7607 | 1/2008 |
| JP | 2008-13654 | 1/2008 |
| JP | 2008-13715 | 1/2008 |
| KR | 1993-0006367 | 7/1986 |

OTHER PUBLICATIONS

English abstract of JP55127444.*
English abstract of JP06049265.*
International Search Report from JP2009/067894.

* cited by examiner

Primary Examiner — Larry Thrower
Assistant Examiner — Xue Liu
(74) Attorney, Agent, or Firm — Amy L. Miller

(57) ABSTRACT

It is an objective of the present invention to provide a method for producing an air-permeable composite sheet which has excellent mechanical strength and compression resistance as well as PTFE's innate property such as air-permeability, water repellency, heat resistance and chemical resistance; and a filter and a fabrics material containing the air-permeable composite sheet produced by the method as a constituent material. The method for producing an air-permeable composite sheet according to the present invention is characterized in comprising steps of filling pores of a porous PTFE sheet with a hardenable material solution; hardening or semi-hardening the porous PTFE sheet filled with the hardenable material solution; and expanding the hardened or semi-hardened porous PTFE sheet.

19 Claims, No Drawings

METHOD FOR PRODUCING AIR-PERMEABLE COMPOSITE SHEET

FIELD OF THE INVENTION

The present invention relates to a method for producing an air-permeable composite sheet, and a filter and the like containing the air-permeable composite sheet.

BACKGROUND

A porous PTFE sheet exhibit a specific properties of passing gases such as water vapor therethrough, while not permeating water, so that the sheet is excellent in moisture permeable waterproof property, by which a low humidity can be kept inside even in rain and in sports. Therefore, a porous PTFE sheet has been widely used as fabrics materials of shoes, wear and the like. In addition, a porous PTFE sheet has been widely used also as various filter materials, since a porous PTFE is excellent in heat resistance and chemical resistance, and the pore size thereof is adjustable.

On the other hand, a porous PTFE sheet is not sufficient in compressive resistance, mechanical strength and abrasion resistance due to the structural issue that a porous PTFE sheet is made of a fluorinated resin and is porous. Hence, technology for improving the strength of a porous PTFE sheet has been studied.

For example, Patent Documents 1 to 9 disclose a porous PTFE sheet of which pores are filled with a filler, and the production methods thereof.

However, the porous PTFE sheets described in the Patent Documents are produded by blending a PTFE powder with a filler powder, and preliminarily-molding the mixture, and then expanding it. As a result, the sheets have a structure in which filler powders are adsorbed on the pores of the porous PTFE sheet, whereby it is difficult to say that the inherent defects of porous PTFE sheet are sufficiently improved.

Additionally, a sheet made of ultra-high molecular weight polyethylene has been known as a porous sheet with wear resistance. However, it is difficult to make the sheet thin, since the sheet is produced by cutting a sintered body. In addition, the sheet is made of polyethylene and thus lacks in compressive resistance and heat resistance.

Patent Document 10 discloses a composite material produced by compressing a thermoplastic resin fiber with heating to produce a porous material, impregnating the porous material with a solution of another thermoplastic resin, and then cooling it. The material is excellent in wear resistance and the like and also has high-strength and is excellent in heat resistance; however, the material does not apparently show permeability that is an inherent characteristic of porous PTFE sheet, since the pores are filled with the resin.

Patent Document 11 discloses a sheet that is improved in both of moisture permeability and wear resistance. However, the sheet is produced by a complicated process of forming a porous polyurethane main layer on a substrate, and then forming a surface layer on the main layer. In addition, it is difficult in such a production process to control the condition for maintaining moisture permeability. Furthermore, the compressibility and heat resistance cannot be improved in the sheet, since the pores of the porous layer are maintained as they are.

PRIOR ART

Patent Documents

Patent Document 1: JP 1-225652 A
Patent Document 2: JP 4-214787 A
Patent Document 3: JP 5-78645 A
Patent Document 4: JP 2004-323717 A
Patent Document 5: JP 2007-253519 A
Patent Document 6: JP 2007-296756 A
Patent Document 7: JP 2008-7607 A
Patent Document 8: JP 2008-13654 A
Patent Document 9: JP 2008-13715 A
Patent Document 10: JP 2001-278997 A
Patent Document 11: JP 2007-196184 A

DESCRIPTION OF THE INVENTION

Problems to be Solved by the Invention

As described above, a variety of technologies for improving porous PTFE sheet have been developed so far. However, there has been no sheet that exhibits both of mechanical strength and compressive resistance without impairing advantages specific to PTFE including permeability, water repellency, heat resistance and chemical resistance.

It is an objective of the present invention to provide a method for producing an air-permeable composite sheet which has excellent mechanical strength and compression resistance as well as PTFE's innate property such as air-permeability, water repellency, heat resistance and chemical resistance; and a filter and a fabrics material containing the air-permeable composite sheet produced by the method as a constituent material.

Means For Solving the Problems

The present inventor made intensive studies to solve the above problems. As a result, the present inventor found that a composite sheet obtained by filling pores of a porous PTFE sheet with a hardening material solution and then hardening or semi-hardening the sheet and further expanding the sheet has a partially exposed PTFE and a continuous hole, and thus has inherent characteristics of the porous PTFE sheet such as permeability and also exhibits improved mechanical strength, and further compressive resistance and abrasion resistance due to the hardening material, thereby completing the present invention.

The method for producing an air-permeable composite sheet according to the present invention is characterized in comprising steps of filling pores of a porous PTFE sheet with a hardenable material solution; hardening or semi-hardening the porous PTFE sheet filled with the hardenable material solution; and expanding the hardened or semi-hardened porous PTFE sheet.

The filter according to the present invention is characterized in comprising the air-permeable composite sheet produced by the method according to the present invention; and the fabrics material according to the present invention is characterized in comprising the air-permeable composite sheet. The filter and fabrics material has properties of the air-permeable composite sheet according to the present invention, such as excellent air-permeability, water repellency, mechanical strength, compression resistance and abrasion resistance.

MODE FOR CARRYING OUT THE INVENTION

The method for producing an air-permeable composite sheet according to the present invention is characterized in comprising steps of filling pores of a porous PTFE sheet with a hardenable material solution; hardening or semi-hardening the porous PTFE sheet filled with the hardenable material solution; and expanding the hardened or semi-hardened porous PTFE sheet.

(1) Filling Step

In the present invention method, first, pores of a porous PTFE sheet are filled with a hardenable material solution.

A porous PTFE sheet to be a raw material used in the present invention is obtained by mixing a polytetrafluoroethylene fine powder with a molding aid in order to obtain a paste, obtaining a molded body from the paste, expanding the molded body after removing or not removing the molding aid from the molded body, and optionally sintering the expanded body. In the case of uniaxial expanding, the sheet has a fibrous structure in which fibrils orient to the expanding direction and there are pores between the fibrils. In the case of biaxial expanding, the sheet has an arachnoid fibrous structure in which fibrils radially extend and there are many pores surrounded by nodes and the fibrils.

The porous PTFE sheet is very useful as a material for a member which has to be produced in high temperature or used outside for a long time, since the PTFE sheet has properties such as heat resistance and weather resistance.

The porosity of the porous PTFE sheet is not particularly limited so long as the sheet can be impregnated with a solution; and for securing impregnation ability thereof, the porosity is preferably not less than 30%, more preferably not less than 50%, and still more preferably not less than 70%. The porosity of the porous PTFE can be calculated with the following equation, using the apparent density $\rho$ (g/cm$^3$) obtained by measurement in accordance with the method for measuring an apparent density defined in JIS K6885.

$$\text{Porosity}(\%) = [(2.2-\rho)/2.2] \times 100$$

The thickness of the porous PTFE sheet to be a raw material is not particularly limited and may be properly determined depending on the intended use; however, the thickness is preferably not less than 1 µm and not more than 1000 µm. If the thickness is less than 1 µm, the sheet strength may be insufficient and thus may be difficult to be handled; while if the thickness exceeds 1000 µm, the re-expanding after the impregnation into a hardenable material solution may be difficult. The thickness of the sheet is preferably not less than 10 µm and not more than 500 µm, and more preferably not less than 20 µm and not more than 200 µm. Moreover, the thickness is preferably adjusted to such an extent that the sheet is capable of being wound in the form of a roll for allowing efficient production such as roll-to-roll processing. In general, a thin sheet may be called as a film, and a thin porous PTFE sheet may be handled as a porous PTFE film; however, in the present invention, a sheet is not particularly distinguished from a film, and the term "sheet" is mainly used.

As the PTFE sheet to be a raw material, a PTFE sheet of which functionality is improved by chemical modification or physical modification may be used. Chemical modification and physical modification methods are not particularly limited; and the chemical modification method is exemplified by a method of adding a functional group to a fibril surface by acetylation, isocyanation, acetalization or the like, and a method of covering a fibril surface with an organic substance or inorganic substance by chemical reaction. The physical modification method is exemplified by physical vapor deposition such as vacuum deposition, ion plating and sputtering, chemical vapor deposition, and plating methods such as electroless plating and electrolytic plating. Only one of the modification methods may be used, or plural methods may be used in combination.

The porous PTFE sheet to be a raw material used in the present invention method may have a single layer or a multiple layer. When a plural porous PTFE sheets to be a raw material are laminated, a hardenable material also plays a role as an adhesive to obtain a air-permeable composite sheet having a multiple layer.

The hardenable material used in the present invention is not particularly limited so long as the material is hardened according to the respective suitable condition. For example, hardenable sol-gel materials, thermoset materials and ultraviolet hardenable materials can be used. Among them, hardenable sol-gel materials are suitable from the viewpoints of heat resistance and mechanical strength.

The term, "hardenable sol-gel material", stands for a material that includes a soluble monomer or oligomer having relatively low-molecular-weight, and is polymerized and hardened by polymerization reaction. Such hardenable sol-gel materials can include metal alkoxide compounds.

The metal element constituting metal alkoxide compounds may be exemplified by Si, Ti, Al, Sn, Zn and Mg. The alkoxy group constituting metal alkoxide compounds may be exemplified by $C_{1-6}$ alkoxy groups such as methoxy, ethoxy, n-propoxy, isopropoxy, n-butoxy, sec-butoxy and t-butoxy. As the metal alkoxide compound, a metal alkoxide compound of which functionality is improved by chemical modification or physical modification may be used. The organic group for modification may be exemplified by $C_{1-20}$ alkyl groups and substituted $C_{1-20}$ alkyl groups; $C_{6-20}$ aryl groups and substituted $C_{6-20}$ aryl groups; $C_{7-20}$ aralkyl groups and substituted $C_{7-20}$ aralkyl groups; organic groups having polarity, such as —C—O—, —C=O, —COO—, —COOH, —CON=, —CN, —NH$_2$, —NH— and an epoxy group; and organic groups having an unsaturated carbon bond, such as >C=CH—.

As the metal alkoxide compound, silicon alkoxide compounds are suitable. The sheet of the present invention produced by impregnating with a silicon alkoxide compound solution and hardening the impregnated sheet is excellent in compressive resistance and mechanical strength. In addition, since a polymer of a silicon alkoxide compound is chemically stable and excellent in heat resistance, weather resistance and the like, such a polymer also can withstand the use in a hot process and in the outdoor.

The silicon alkoxide compound may be exemplified by methyltrimethoxysillane, methyltriethoxysillane, ethyltrimethoxysillane, ethyltriethoxysillane, propyltrimethoxysillane, propyltriethoxysillane, isobutyltrimethoxysillane, isobutyltriethoxysillane, diisobutyldimethoxysillane, dimethoxymethylsillane, phenyltriethoxysillane, methacryloxypropyltrimethoxysillane, aminopropyltriethoxysillane, aminoethylaminopropyltriethoxysllane, tetramethoxysillane, tetraethoxysillane, tetraisopropoxysillane, tetrabutoxysillane, and oligomers thereof. The silicon alkoxide compound may contain other metal alkoxide compound such as aluminium alkoxide compound, titanium alkoxide compound and zirconium alkoxide compound, as long as the silicon alkoxide compound contains silicon alkoxide as main component, that is, not less than 50% of silicon alkoxide.

The term, "thermoset material", stands for a material in which polymerization reaction is initiated by heating and which is irreversibly hardened by forming a three-dimensional cross linked structure between molecules. The thermoset materials is exemplified by, for example, thermosetting epoxy resins, phenol resins, melamine resins, urethane resins and unsaturated polyester resins.

The term, "ultraviolet hardenable material", stands for a material in which polymerization reaction or crosslinking reaction is initiated by ultraviolet irradiation to be hardened. The ultraviolet hardenable materials is exemplified by, for example, epoxy acrylate, urethane acrylate and polyester acrylate.

The ratio of a hardenable material in a solution may be properly adjusted. For instance, the content amount of a final hardenable material in the sheet of the present invention depends on not only the porosity of the used porous PTFE sheet to be a raw material but also the concentration of the hardenable material solution. Hence, the concentration of the hardenable material solution can be adjusted according to the compressive resistance and the mechanical strength demanded for the sheet of the present invention. The concentration is generally preferably not less than about 20 wt % and not more than about 95 wt %.

The solvent constituting the hardenable material solution used in the present invention method may be properly selected from solvents that can dissolve the hardenable material to be used. For example, when a metal alkoxide compound is used as a hardenable sol-gel material, an alcohol is preferable. Alcohol is excellent in solubility for metal alkoxide compounds and also can be readily distilled off after polymerization reaction. In addition, for efficiently progressing sol-gel reaction, not less than about 0.2 mol/L and not more than 50 mol/L of water may be added to the solution.

As the alcohol, methanol, ethanol, 1-propanol, 2-propanol and butanol are exemplified. Only one of them may be used or more than one may be combined for use. The mixing ratio may not be limited. The alcohol corresponding to the alkoxide group in a metal alkoxide compound is preferable. To the metal alkoxide solution, an acid or base may be added as a catalyst for the polymerization reaction of a metal alkoxide compound. As such an acid, hydrochloric acid, sulfuric acid, nitric acid, acetic acid and hydrofluoric acid are exemplified; and as such a base, sodium hydroxide, potassium hydroxide and ammonia are exemplified.

To the hardenable material solution used in the present invention method, a metal oxide particle may further be added. The properties derived from the metal oxide particle to be added can be imparted to the composite sheet of the present invention. For example, the particle of oxide of one or two or more metals selected from boron, aluminum, silicon, titanium, germanium, yttrium, zirconium, niobium, tantalum, zinc, indium, tin, barium, magnesium and lithium may be added; as a result, the properties of the metal oxide particle can be imparted to the present invention sheet. For example, linear coefficient of thermal expansion and heat shrinkage factor of the sheet can be reduced.

The average particle diameter of the metal oxide particle is not particularly limited; however, if the average diameter is too large, the particle may be dropped out of the composite sheet. The average particle diameter is therefore preferably not more than 200 nm, more preferably not more than 100 nm, more preferably not more than 50 nm, and still more preferably not more than 20 nm. The lower limit of the average particle diameter is not particularly limited; however, the average diameter is, for example, not less than 1 nm. The narrower the particle size distribution is, the better it is; and it is preferable that there be no particle of which diameter exceeds 200 nm. The shape of the metal oxide particle is not particularly limited; however, the particle may be sphere-shaped, rod-shaped, indeterminate-shaped or the like; these particles may be used alone or in combination of plural shapes. Two or more kinds of different metal oxide particles may be blended together.

The blending amount of the metal oxide particle is not particularly limited; and in general, the ratio is preferably not less than 10% by mass and not more than 90% by mass relative to the amount of the hardenable material solution. If the amount is less than 10% by mass, the effect of the added metal oxide particle may not be sufficiently exerted. On the other hand, if the amount exceeds 90% by mass, there is a possibility that the polymerization reaction of the metal alkoxide compound may not sufficiently proceed. The blending amount is more preferably not less than 20% by mass and not more than 80% by mass, and still more preferably not less than 30% by mass and not more than 60% by mass.

Additionally, to the hardenable material solution, can be added various organic-based or inorganic-based additives such as an ultraviolet absorber, an antimicrobial agent, an antistatic agent, a photocatalyst, a hardening catalyst other than the above, a plasticizer, a thickener, a defoamer, carbon black, and colorant such as a pigment and a dye.

The method for filling the porous PTFE sheet with the hardenable material solution is not particularly limited and common procedures can be used. The method may be any one of, for example, vacuum pressure impregnation, vacuum impregnation, spraying, evaporation to dryness, a metaling bar method, a die coating method, a gravure method, a reverse roll method and a doctor blade method. Even if the solution is applied to the porous PTFE sheet only, the pores are filled with the solution. In other words, the term, "filling", in the present invention is a concept that the void of the porous PTFE sheet may be simply filled with the solution and includes applying and the like as a means for that purpose.

When the porous PTFE sheet is thin, the pores of the porous PTFE sheet may be filled with the solution only by the impregnation of one time. On the other hand, when the porous PTFE sheet is thick, the void may not be able to be completely filled with the solution only by the impregnation of one time. In such a case, the sheet is impregnated with the solution a plurality of times so that the void is made to be completely filled.

The application method is not particularly limited, and may be, for example, any method such as a metaling bar method, a die coating method, a gravure method, a reverse roll method and a doctor blade method.

When the solution is applied, it is preferable that the application is carried out in a state in which the solvent of the surface to be applied of the porous PTFE sheet is removed as much as possible. If the application is carried out in a state in which a solvent is attached to the surface of the porous PTFE sheet, coating stains are likely to occur, which may adversely affect the homogeneity and thickness of the single layer of the polymer of the metal alkoxide compound. In order to improve adhesion of the porous PTFE sheet and the polymer layer, the surface of the porous PTFE sheet can also be subjected to surface activation treatment such as a corona treatment, a plasma treatment, a flame treatment and an alkali treatment.

(2) Hardening Step

Next, the porous PTFE sheet filled with the hardenable material solution is hardened or semi-hardened.

Hardening or semi-hardening is carried out by hardening means in accordance with the used hardenable material. For example, when a hardenable sol-gel material is used, a sol-gel reaction is conducted; and when a thermoset material or an ultraviolet hardenable material is used, heating or ultraviolet radiation is carried out, respectively. The term, "semi-hardening", stands for not complete hardening; and the hardening extent may be adjusted by, for example, not sufficiently removing the solvent or heating in a sol-gel reaction, or by decreasing the heating temperature or the amount of ultraviolet radiation or by shortening the heating time or ultraviolet radiation time in other hardening means.

The sol-gel reaction is described in detail. For instance, when a silicon alkoxide compound is used, the sol-gel reaction is progressed that generates a siloxane bond in oligomerizztion or polymerization with Si—O bond. The hardening method is not particularly limited as long as the polymerization reaction proceeds; and the methods include a method that imparts energy to the material by irradiating ultraviolet light, x-rays, electron beams, infrared light or microwaves in addition to a heat treatment. It is preferable to carry out a heat treatment, since the treatment can be easily carried out.

The temperature of the heat treatment for hardening a hardenable sol-gel material may be properly adjusted; and in general, the temperature is set at not less than about 20° C. and not more than about 320° C. The hardening reaction may hardly proceed in some cases at less than 20° C.; on the other hand, when the temperature exceeds 320° C., crack may be likely to be generated and thus a good composite sheet may be hardly obtained. The temperature is more preferably not less than 100° C. and not more than 300° C., and still more preferably not less than 200° C. and not more than 300° C. The heating time may also be properly adjusted, and generally the time is not less than about 10 minutes and not more than about 360 minutes. When energy beam is radiated, the kind and strength thereof can also be properly selected.

When the polymerization reaction is carried out at a relatively low temperature, the material may further be heated preferably under reduced pressure to evaporate the remaining solvent.

(3) Expanding Step

Next, the hardened or semi-hardened porous PTFE sheet is expanded. By this step, the porous PTFE sheet consisting of nodes and fibrils of which surface is intermittently covered with the hardenable material can be obtained.

The expanding ratio may be properly adjusted, and is preferably not less than 1.1 times and not more than 20 times. If the expanding ratio is less than 1.1 times, the sheet may not become porous sufficiently, and thus there may be a fear that the permeability may not be kept. On the other hand, if the expanding ratio exceeds 20 times, disadvantages such as fracture and necking may be generated and hence a good composite sheet may not be obtained. The expanding ratio is more preferably not less than 2 times and not more than 10 times.

As the expanding means, common procedures may be used; and for example, a method of passing the hardened or semi-hardened porous PTFE sheet between rolls having different rotating speed can be adopted. The expanding may be uniaxial expanding or biaxial expanding, both of which may be properly selected.

The step re-generates continuous holes that penetrate from the surface to the back in the porous PTFE sheet having pores filled with a hardenable material. The hardenable material is partially present on the surface of such pores, and PTFE is exposed in the other parts. As a result, the porous PTFE sheet maintains the inherent properties thereof, such as permeability and water repellency, and also shows improved compressive resistance. The presence or absence of the continuous hole in the present invention sheet can be readily confirmed by an air permeability tester or the like.

The content ratio of a hardenable material contained in the composite sheet of the present invention is preferably not less than about 10% by mass and not more than about 90% by mass. If the ratio of the hardenable material is less than 10% by mass, the compressive resistance and the mechanical strength may not be sufficiently improved. On the other hand, if the ratio exceeds 90% by mass, the strength of the PTFE relative to the hardenable material may be relatively decreased so that the sheet may be fractured before sufficient expanding, and also the exposure of the PTFE may be excessively decreased so that the inherent properties of PTFE, such as permeability and water repellence, may not be maintained.

The ratio is more preferably not less than about 30% by mass and not more than about 80% by mass.

(4) Re-Hardening Step

The expanded composite sheet may be re-hardened in order to further harden the hardenable material or harden the semi-hardened hardenable material. By such a re-hardening, further improvement of the heat resistance and mechanical strength of the composite sheet can be expected so that the use under further high temperature or high pressure conditions may be possible. Such re-hardening can be carried out by heating.

The permeable composite sheet of the present invention produced by the above method is improved in compressive resistance, mechanical strength and abrasion resistance in addition to innate properties of the porous PTFE sheet including chemical resistance, heat resistance, permeability and water repellence. The PTFE sheet is therefore useful particularly as a filter material and a fabrics material.

The composite sheet of the present invention may be a single layer sheet or laminated sheet. The composite sheet of the present invention may be a laminated sheet produced by, for example, laminating a single layer composite sheet according to the present invention to a single layer composite sheet according to the present invention, or alternatingly-laminating another layer consisting of resin or an inorganic substance to a single layer composite sheet according to the present invention.

The number of layers and the thickness of each layers can be adjusted in accordance with purposes. The above resin layer is preferably made from, for example, a fluorine resin, an acrylic resin, triacetyl cellulose or polyvinyl alcohol. The inorganic layer is also not particularly limited; and the material thereof, for example, can be an oxide, nitride or oxynitride including one or more of Si, Al, In, Sn, Zn, Ti, Cu, Ce, Ta and the like. The method for forming the resin layer and inorganic layer may be any method so long as an objective thin film can be formed; and the example thereof includes physical vapor deposition such as a sputtering method, a vacuum deposition method and an ion plating method, and an application method of forming a film by a chemical reaction using heat energy and light energy, and chemical vapor deposition method.

When a conventional porous PTFE sheet is used as various filter materials, such a filter is excellent in chemical resistance and heat resistance; however, a filter with satisfied performance is never obtained, since the pores thereof are broken or the filter itself is damaged due to the pressure of the fluid or the collision of foreign matter. However, the filter including the permeable composite sheet according to the present invention as a constituent material is excellent also in compressive resistance and abrasion resistance. Therefore, although it is impossible for the conventional porous PTFE filters to directly remove foreign particles or dusts adsorbed on the surface with a brush, the filter according to the present invention is very rarely damaged and the pores thereof are hardly collapsed, so that the above-mentioned maintenance is possible for the present invention filter.

When a conventional porous PTFE sheet is used as a fabrics material, for example, used as rainwear, it is needed to make a special effort, since the porous PTFE is inferior in abrasion resistance. On the other hand, since the permeable composite sheet according to the present invention is excellent in abrasion resistance and mechanical strength, the fabrics material containing the present invention sheet is also excellent in abrasion resistance and mechanical strength in addition to permeability and water repellence. The term, "fabrics material", in the present invention stands for a textile product such as fiber, fabrics and cloth.

The permeable composite sheet according to the present invention is also excellent both in mechanical strength and compressive resistance in addition to innate properties of PTFE including permeability, water repellence, heat resistance and chemical resistance. According to the present invention method, a permeable composite sheet having such excellent properties can simply and easily be produced. Therefore, the present invention relates to a sheet useful as a filter material, a fabrics material or the like, and thus is industrially very useful.

EXAMPLES

Hereinafter, the present invention is described in detail with reference to examples; however, it is not intended that the present invention be limited to the demonstrated examples, the present invention can be modified in adherence with the spirit of the disclosure of the specification in order to be carried out, and such modifications are included in the range of the present invention.

Example 1

A porous PTFE sheet (thickness: 60 μm, porosity: 70%) was cut out into 25 cm×30 cm. The sheet was sufficiently impregnated with a silica solution (silicon alkoxide solution manufactured by Nikko Inc., product name: Heatless Glass GS-600-1), and then taken out of the silica solution. The solvent was distilled off by heating the sheet at 70° C. for 5 minutes until the silica solution became nonviscous. Next, the sheet was uniaxially expanded 4-fold. The sheet was further heated at 100° C. for 3 hours for re-hardening in order to obtain a permeable composite sheet. When water was added dropwise to the obtained permeable composite sheet, water was repelled without infiltration into the membrane.

Example 2

A porous PTFE sheet (thickness: 165 μm, porosity: 70%) was cut out into 25 cm×30 cm. The sheet was sufficiently impregnated with a silica solution (silicon alkoxide solution manufactured by Nikko Inc., product name: Heatless Glass GS-600-1), and then taken out of the silica solution. The solvent was distilled off by heating the sheet at 70° C. for 5 minutes until the silica solution became nonviscous. Next, the sheet was uniaxially expanded 4-fold. The sheet was further heated at 100° C. for 3 hours for re-hardening in order to obtain a permeable composite sheet. When water was added dropwise to the obtained permeable composite sheet, water was repelled without infiltration into the membrane.

Example 3

A porous PTFE sheet (thickness: 100 μm, porosity: 70%) was cut out into 25 cm×30 cm. The sheet was sufficiently impregnated with a silica solution (silicon alkoxide solution manufactured by Nikko Inc., product name: Heatless Glass GS-600-1), and then taken out of the silica solution. The solvent was distilled off by heating the sheet at 70° C. for 5 minutes until the silica solution became nonviscous. Next, the sheet was uniaxially expanded 1.5-fold. The sheet was further heated at 100° C. for 3 hours for re-hardening in order to obtain a permeable composite sheet. When water was added dropwise to the obtained permeable composite sheet, water was repelled without infiltration into the membrane.

Test example 1

Air Permeability Test

The Gurley numbers of the permeable composite sheets produced in the above Examples 1 and 2 were measured by using an Oken type air permeability tester (manufactured by Asahi Seiko Co., Ltd., product name: KG1S) in accordance with the method of JIS P8117. In addition, the porous PTFE sheets used as raw materials in the above Examples 1 and 2 were regarded as Comparative examples 1 and 2 respectively, and the Gurley numbers thereof were similarly measured. The Gurley number means the time (sec) for 100 cm$^3$ of air passes through a sample with an area of 6.45 cm$^2$ at a pressure of 1.29 kPa in the vertical direction. The results are shown in Table 1.

TABLE 1

|  | Example 1 | Comparative example 1 | Example 2 | Comparative example 2 |
| --- | --- | --- | --- | --- |
| Gurley number (sec) | 1.2 | 2.8 | 9 | 17 |

As shown in Table 1, although the permeable composite sheets according to the present invention included silica gel as a hardenable material, the sheets had sufficient air permeabilities due to being expanded, and permeabilities thereof were rather higher than those of the porous PTFE sheets to be used as a raw material.

Test example 2

Compressive Resistance Test

The permeable composite sheets produced in the above Examples 1 and 3 and the raw material porous PTFE sheets thereof (Comparative examples 1 and 3) were compressed using a small press machine, and respective compressibilities were measured.

Specifically, first, the upper plate of the small press machine was heated to each temperature shown in Table 2, and each sheet was pressurized for 10 seconds at a press pressure of 40 kgf/cm$^2$ (about 3.9 MPa). Additionally, the same procedure was carried out at ambient temperature. After the press procedure, the decrease ratio of thickness (%) relative to the case where each sheet before pressurized was set at 100 was calculated by the following equation as the criterion of compressive resistance. The results are shown in Table 2.

The decrease ratio of thickness(%)=100−[(the thickness after the press procedure/the thickness before the press procedure)×100]

TABLE 2

|  | temperature of press procedure | | | |
| --- | --- | --- | --- | --- |
|  | ambient temperature | 100° C. | 200° C. | 300° C. |
| Comparative example 1 | 35.5% | 44.0% | 53.7% | 57.4% |
| Example 1 | 1.0% | 0.9% | 0.0% | 1.0% |
| Comparative example 3 | 10.3% | 32.5% | 32.2% | 35.8% |
| Example 3 | 1.4% | 2.7% | 4.1% | 5.4% |

In addition, the decrease ratio of thickness (%) of each sheet when each sheet was pressurized for 10 seconds at press pressures shown in Table 3 without heating the upper plate was calculated as described above. The results are listed in Table 3.

TABLE 3

| | press presure | | | |
|---|---|---|---|---|
| | 40 kgf/cm² (ca. 3.9 MPa) | 80 kgf/cm² (ca. 7.8 MPa) | 120 kgf/cm² (ca. 11.8 MPa) | 160 kgf/cm² (ca. 15.7 MPa) |
| Comparative example 1 | 21.6% | 44.3% | 49.1% | 51.8% |
| Example 1 | 0.0% | 1.0% | 1.0% | 1.9% |
| Comparative example 3 | 10.3% | 40.2% | 40.9% | 45.7% |
| Example 3 | 1.4% | 4.0% | 4.7% | 4.0% |

As in the above results, conventional porous PTFE sheets were insufficient in compressive resistance and were hardly returned to the former state when pressurized. On the other hand, in the permeable composite sheet according to the present invention, the decrease ratio of thickness (%) was reduced to not more than about 5% or less even when pressurized at high temperature and high pressure, indicating that the compressive resistance is improved remarkably. Therefore, the permeable composite sheet according to the present invention is thought to be very useful as a filter material or a fabrics material that require compressive resistance.

Test Example 3

Mechanical Strength Test

The mechanical strengths of the permeable composite sheet produced in the above Example 3 and the porous PTFE sheet (Comparative example 3) to be a raw material were measured in the conditions of a sample width of 5 mm and a speed of 50 mm/min by using a tensile testing machine (RTC-1210A, manufactured by ORIENTEC). The results are shown in Table 4.

TABLE 4

| | Example 3 | Comparative example 3 |
|---|---|---|
| Mechanical strength(N/mm²) | 14.5 | 6.5 |

As the above results, it could be confirmed that the permeable composite sheet according to the present invention had a twice or more strength as compared with the porous PTFE sheet to be a raw material.

What is claimed is:

1. A method for producing one of an air-permeable filter and an air-permeable fabrics material comprising, as a constituent material, an air-permeable composite sheet, said method comprising:
   filling pores of a porous polytetrafluoroethylene (PTFE) sheet with a hardenable material solution comprising a hardenable material;
   hardening or semi-hardening the porous PTFE sheet filled with the hardenable material solution to increase compression resistance and mechanical strength of the air-permeable composite sheet; and
   expanding the hardened or semi-hardened porous PTFE sheet, after said hardening or semi-hardening step, to increase porousness of the hardened or semi-hardened porous PTFE sheet, wherein the expanding step re-generates continuous holes through the composite sheet, and wherein the hardenable material is present on the parts of the surface of the pores of the PTFE sheet and the PTFE sheet is exposed in other parts to provide water repellency on the exposed other parts.

2. The production method according to claim 1, further comprising:
   re-hardening the expanded porous PTFE sheet.

3. The production method according to claim 1, wherein an expanding ratio is set to not less than 1.1 times and not more than 20 times in the step of expanding the hardened or semi-hardened porous PTFE sheet.

4. The production method according to claim 1, wherein a silicon alkoxide compound is used as the hardenable material.

5. The production method according to claim 1, wherein the PTFE sheet has a porosity of not less than 30%, and a thickness of not less than 10 μm.

6. The production method according to claim 1, wherein the PTFE sheet has a porosity of not less than 70%, and a thickness of not less than 20 μm and not more than 200 μm.

7. The production method according to claim 1, further comprising:
   filling pores of at least one additional PTFE sheet with said hardenable material solution; and
   laminating all of the porous PTFE sheets together.

8. The production method according to claim 1, wherein a concentration of the hardenable material in the hardenable material solution is not less than about 20 wt. %.

9. The production method according to claim 1, wherein the hardenable material solution further comprises:
   metal oxide particles.

10. The production method according to claim 9, wherein the metal oxide particles have an average particle diameter of not more than 200 μm.

11. The production method according to claim 9, wherein a ratio of the amount of the metal oxide particles to the hardenable material solution is not less than 10% by mass.

12. The production method according to claim 1, wherein the hardening step comprises heat treatment of porous PTFE sheet filled with the hardenable material solution.

13. The production method according to claim 1, wherein a ratio of the hardenable material contained in the composite sheet is not less than about 10% by mass.

14. A method for producing one of an air-permeable filter and an air-permeable fabrics material comprising, as a constituent material, an air-permeable composite sheet, said method comprising:
   filling pores of a porous polytetrafluoroethylene (PTFE) sheet with a hardenable material solution comprising a hardenable material;
   hardening or semi-hardening the porous PTFE sheet filled with the hardenable material solution to increase compression resistance and mechanical strength of the air-permeable composite sheet; and
   expanding the hardened or semi-hardened porous PTFE sheet, after said hardening or semi-hardening step, to increase porousness of the hardened or semi-hardened porous PTFE sheet, wherein the expanding step re-generates continuous holes through the composite sheet, wherein the hardenable material is present on the parts of the surface of the pores of the PTFE sheet and the PTFE sheet is exposed in other parts to provide water repellency on the exposed other parts, and wherein an expanding ratio is set to not less than 1.1 times and not more than 20 times in the step of expanding; and
   re-hardening the expanded porous PTFE sheet.

15. The production method according to claim 14 wherein the PTFE sheet has a porosity of not less than 70%, and a thickness of not less than 20 μm and not more than 200 μm.

16. The production method according to claim 15, wherein a concentration of the hardenable material in the hardenable material solution is not less than about 20 wt. %.

17. The production method according to claim 16, wherein the hardenable material solution further comprises:
  metal oxide particles, wherein the metal oxide particles have an average particle diameter of not more than 200 µm.

18. The production method according to claim 17, wherein a ratio of the amount of the metal oxide particles to the hardenable material solution is not less than 10% by mass.

19. The production method according to claim 2, wherein the hardening step comprises heat treatment of porous PTFE sheet filled with the hardenable material solution, and wherein the rehardening step comprises heat treatment of the expanded and hardened or semi-hardened porous PTFE sheet.

\* \* \* \* \*